(12) United States Patent
Kyllönen et al.

(10) Patent No.: US 7,588,617 B2
(45) Date of Patent: Sep. 15, 2009

(54) HIGH EFFICIENCY GREASE FILTER CARTRIDGE

(75) Inventors: Pekka Kyllönen, Lahti (FI); Rick Bagwell, Scottsville, KY (US); Darrin Beardslee, Bowling Green, KY (US); Andrey Livchak, Bowling Green, KY (US); Derek Schrock, Bowling Green, KY (US)

(73) Assignee: OY Halton Group Ltd. (FI)

( * ) Notice: Subject to any disclaimer, the term of this patent is extended or adjusted under 35 U.S.C. 154(b) by 243 days.

(21) Appl. No.: 11/495,744

(22) Filed: Jul. 31, 2006

(65) Prior Publication Data

US 2007/0023349 A1 Feb. 1, 2007

Related U.S. Application Data

(60) Provisional application No. 60/595,736, filed on Aug. 1, 2005.

(51) Int. Cl.
*B01D 45/12* (2006.01)

(52) U.S. Cl. .............................. 55/477; 55/346; 55/447; 55/484; 55/DIG. 36

(58) Field of Classification Search .................. 55/345, 55/346, 442, 443, 477, DIG. 36, 447, 456, 55/484; 95/268, 269
See application file for complete search history.

(56) References Cited

U.S. PATENT DOCUMENTS

| | | | |
|---|---|---|---|
| 2,027,906 A | 1/1936 | Hand | |
| 3,290,868 A * | 12/1966 | Upor | 55/343 |
| 4,787,920 A * | 11/1988 | Richard | 95/214 |
| 4,872,892 A | 10/1989 | Vartiainen et al. | |
| 5,329,765 A * | 7/1994 | Mai et al. | 60/311 |
| 6,251,153 B1 | 6/2001 | Neitzel et al. | |
| 6,797,041 B2 | 9/2004 | Brownell et al. | |
| 6,994,743 B2 | 2/2006 | Brownell et al. | |

FOREIGN PATENT DOCUMENTS

| | | |
|---|---|---|
| CH | 257710 | 10/1948 |
| CH | 257710 | 4/1949 |
| DE | 257710 | 4/1949 |
| EP | 0 875 275 | 4/1998 |
| EP | 0 875 275 B1 | 4/1998 |
| EP | 0875275 B1 | 4/1998 |
| FR | 935.802 | 11/1946 |
| FR | 935.802 | 7/1948 |
| FR | 935802 | 7/1948 |
| WO | WO 00/61262 | 10/2000 |

* cited by examiner

*Primary Examiner*—Frank M Lawrence
*Assistant Examiner*—Robert A Clemente
(74) *Attorney, Agent, or Firm*—Miles & Stockbridge P.C.; Mark A. Catan

(57) ABSTRACT

A grease filter has a filtering portion configured such that fumes enter a major face thereof and flow through a grease extraction filter therewithin in a direction parallel to the major face. A frame that fits into an opening of a hood defines a box structure that is configured to allow flow from the end (or ends) of the filtering portion where flow exits. The frame permits the flow to exit to a side opposite the face even when the frame is surrounded, edgewise, by a solid structure of the hood opening

25 Claims, 15 Drawing Sheets

HIGH EFFICIENCY GREASE FILTER CARTRIDGE

CROSS-REFERENCE TO RELATED APPLICATIONS

This application claims priority to U.S. Provisional Application 60/595,736, filed Aug. 1, 2005.

BACKGROUND

Generally, brush type filters are known in the prior art. However, many of the advantages of high density and high surface area attending these kinds of filters have not been realized in grease cartridge-type filters due to various operational and mechanical problems which are addressed in the present set of inventions.

Centrifugal grease filter cartridges are known. Many such filters have short centrifugal flow paths and hardly benefit from the vortex separation principle. There is an on-going need for refinements in their structure and operation as well as for enhancements to their interface characteristics.

SUMMARY

Briefly, and in regarding only certain embodiments, a grease filter has a filtering portion configured such that fumes enter a major face thereof and flow through a grease extraction filter therewithin in a direction parallel to the major face. A frame that fits into an opening of a hood defines a box structure that is configured to allow flow from the end (or ends) of the filtering portion where flow exits. The frame permits the flow to exit to a side opposite the face even when said frame is surrounded, edgewise, by a solid structure of the hood opening. Various embodiments provide augmented surface area to improve capture efficiency, filter support designs that reduce turbulence, and other features.

According to an embodiment of the invention, the invention provides a grease extraction filter assembly, comprising: a filtering portion configured such that fumes enter a major face thereof in a first direction parallel to the major face and flow through a grease extraction filter therewithin in a second direction parallel to the major face, a frame defining a box structure configured to allow flow from at least one end of the filtering portion where flow exits in the second direction and flows to a side opposite of the major face, the frame being configured to fit in a support that surrounds the frame edgewise.

According to an embodiment of the invention, the invention provides a grease extraction filter assembly, comprising: a filtering portion configured such that fumes enter a major face thereof and flow through a grease extraction filter therewithin in a direction parallel to the major face, a frame defining a box structure configured to allow flow from at least one end of the filtering portion where flow exits in the direction to flow to a side opposite of the face even when the frame is surrounded edgewise by a solid structure. A variation the invention is such that the frame fits in an opening defined by a surrounding box structure whose edges wrap at least partly around the major face. Another variation the invention is such that the frame has one of pins and recesses for receiving pins. The grease filter may be located on a side of the frame, the side being taken in a direction perpendicular to the major face. The grease filter may be located on a downstream side of the frame, the side being taken in a direction perpendicular to the major face. The grease filter may be located on an upstream side of the frame, the side being taken in a direction perpendicular to the major face.

According to an embodiment of the invention, the invention provides a grease extraction filter assembly, comprising: a grease filter having a major face and a fume inlet on the major face, the inlet being oriented in a primary orientation in the major face and the grease filter providing flow out of the grease filter in a direction perpendicular to the major face, a supporting structure including at least one holding bracket positioned on at least a top or bottom of the major face of the grease filter and permitting flow exiting in the direction perpendicular to the major face to turn toward the direction parallel to the major face. A variation provides that the at least one holding bracket is of flexible spring material configured to slip inside a framed opening. Another variation provides that the at least one holding bracket is positioned along the edge of the grease filter and provide a gas flow path out of the grease filter.

According to an embodiment of the invention, the invention provides a grease extraction filter assembly, comprising: a filter portion having parallel flow channels, each flow channel having at least one end and a spoked structure with a longitudinal support and bristles extending in a radial pattern from the support, the spoked structure being inserted in the each flow channel and removable therefrom at the each flow channel at least one end. In a variation the invention is such that the spoked structures are connected to a common support located outside the filter portion to allow removal of the spoked structures from multiple flow channels at once. In another variation the invention is such that the radial pattern is a 360 degree pattern. In another variation the invention is such that the spoked structures and longitudinal supports are supported in the by the respective bristles. In another variation the invention is such that the flow channels have inlets forming slots parallel to the longitudinal supports. In another variation the invention is such that the flow channels have flow exits at their ends. In another variation the invention is such that the inlets provide for flow into the flow channels in a direction perpendicular to the longitudinal supports. In another variation the invention is such that the longitudinal supports are parallel to the longitudinal axes of the flow channels. In another variation the invention is such that the flow channels are rectangular ducts with slot-shaped inlets along a face of each duct and flow exits at their ends. In another variation the invention is such that the spoked structures are connected to a common support located outside the filter portion to allow removal of the spoked structures from multiple flow channels at once. In another variation the invention is such that the radial pattern is a 360 degree pattern. In another variation the invention is such that the spoked structures and longitudinal supports are supported in the by the respective bristles. In another variation the invention is such that the inlets provide for flow into the flow channels in a direction perpendicular to the longitudinal supports. In another variation the invention is such that the longitudinal supports are parallel to the longitudinal axes of the flow channels.

According to an embodiment of the invention, the invention provides a grease extraction filter assembly, comprising: a filter portion having parallel flow channels, each flow channel having at least one end and a spoked structure with a longitudinal support and bristles extending in a radial pattern from the support, the flow channels being adjacent to form a common inlet face and having inlets through the common inlet face. In a variation the invention is such that the flow channels have outlets on a side of the channels opposite the inlets, the inlets and outlets being displaced in an axial direction relative to each other. In another variation the invention is such that the inlets are located at one end of the common inlet face. In another variation the invention is such that the flow channels have outlets on a side of the channels opposite the inlets, the outlets being displaced in an axial direction relative to the inlets.

According to an embodiment of the invention, the invention provides a grease extraction filter assembly, comprising: a filter cartridge having at least two parallel flow channels each having a longitudinal axis, each of the flow channels having a removable brush element having radial bristles surrounding a longitudinal support aligned its axis, each channel having an inlet, all the inlets facing a common side of the cartridge. In another variation the invention is such that the cartridge is a generally planar module having an approximately square aspect ratio. In another variation the invention is such that the inlets face a major plane of the module.

DESCRIPTION OF THE EMBODIMENTS

Figures 1A, 1B:
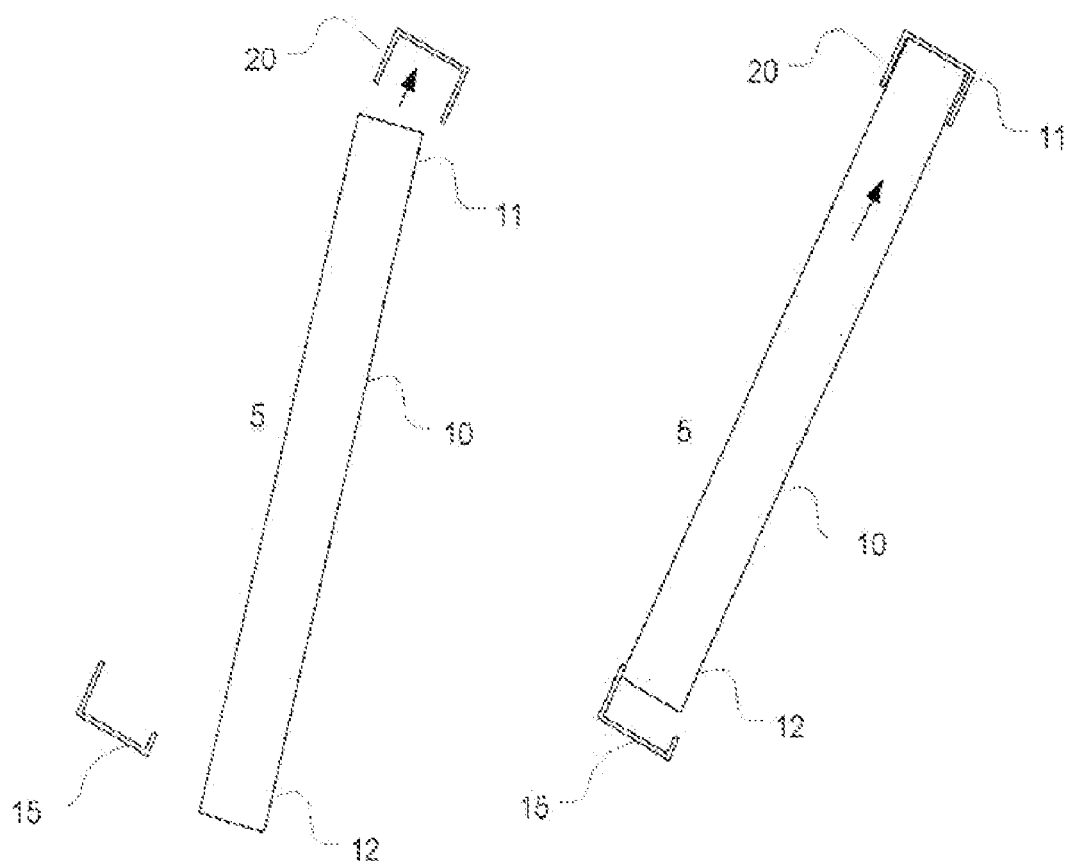
FIGS. 1A to 1C illustrate a filter being moved into position to install inside a filter bracket of an exhaust hood.

FIG. 1A is a side view of a typical grease extraction filter 10 being moved into position to install it a common type of support structure connected to a typical exhaust hood. There are filter brackets on the top 20 and bottom 15 of an exhaust opening 5 in the interior of a hood (not shown) that supports the filter. In the sequence of FIGS. 1A, 1B, and IC, a top end 11 of the filter 10 is inserted in the top filter bracket 20 as the bottom end 12 is swung toward the opening 5 into alignment with the bottom bracket 15. Then the filter 10 is lowered until captured by the bottom bracket 15. After this, the filter 10 is held in place by gravity.

Figure 1C:
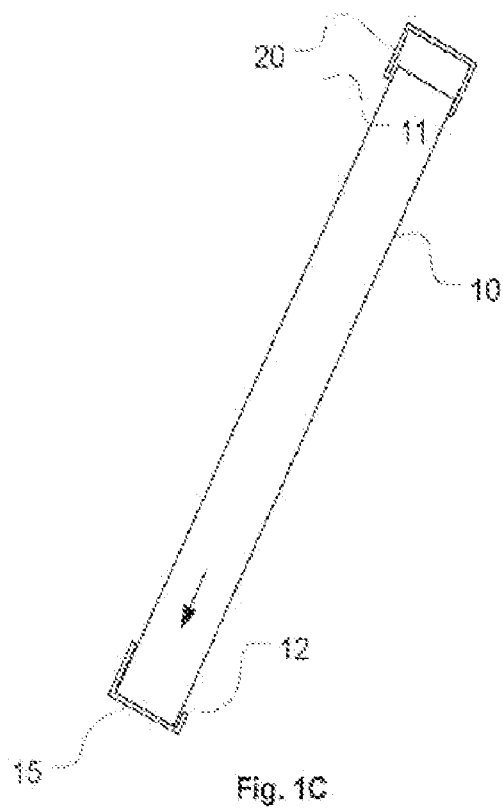
Figure 1D:
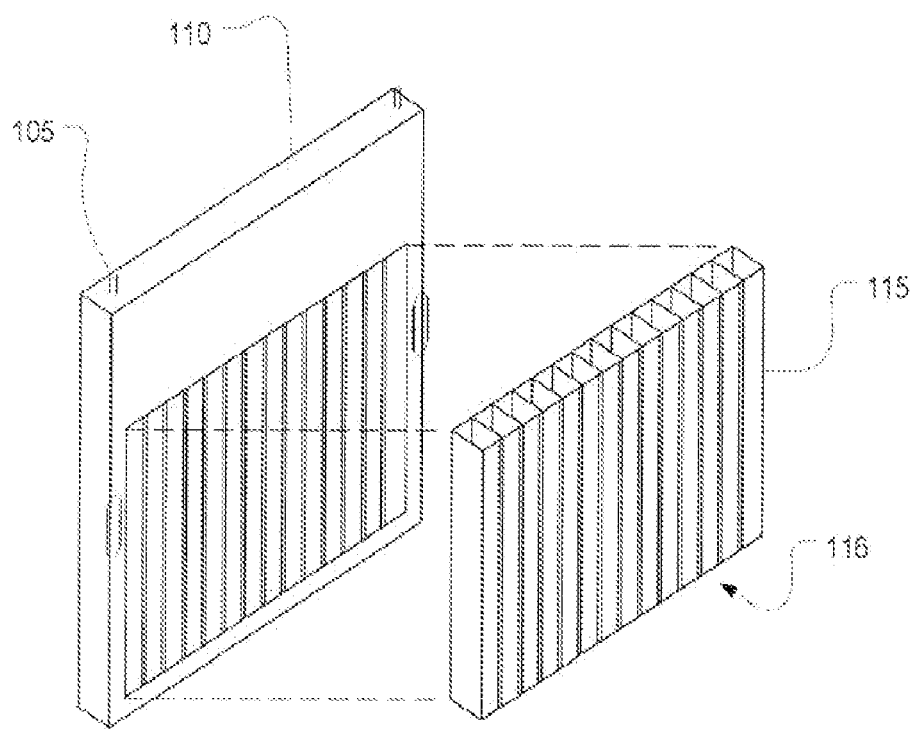
FIG. 1D is an isometric view of a grease extraction filter frame embodiment which can be incorporated to fit into a standard hood extraction filter opening.

FIG. 1D shows an embodiment of a centrifugal grease extraction filter portion 115 which can be assembled into an adapter frame 110, similar to that of FIGS. 1A-1C, which fits inside a standard hood opening. The assembly 116 may be part of a manufacturing process such that the completed filter forms a single structure or the frame may be provided for various different filtering portions, such as shown at 115. In the present embodiment, pins 105 attached to the top of the filter fit into openings in a frame portion 140 to hold the top of the filter 110 in place inside the hood rather than the top of the filter fitting into a bracket as in the earlier embodiments. A bottom filter bracket 145 holds the filter frame 110 in place at the bottom edge, preventing the filter frame 110 from being pulled out by air moving through the filter. It is contemplated that in the present embodiment, flow enters through a face of the filter and exits out ends of the filter body. Examples of such centrifugal filters are described in U.S. Pat. No. 4,872,892, entitled Air Purifier. One type is illustrated in the next figure.

Figure 1E:
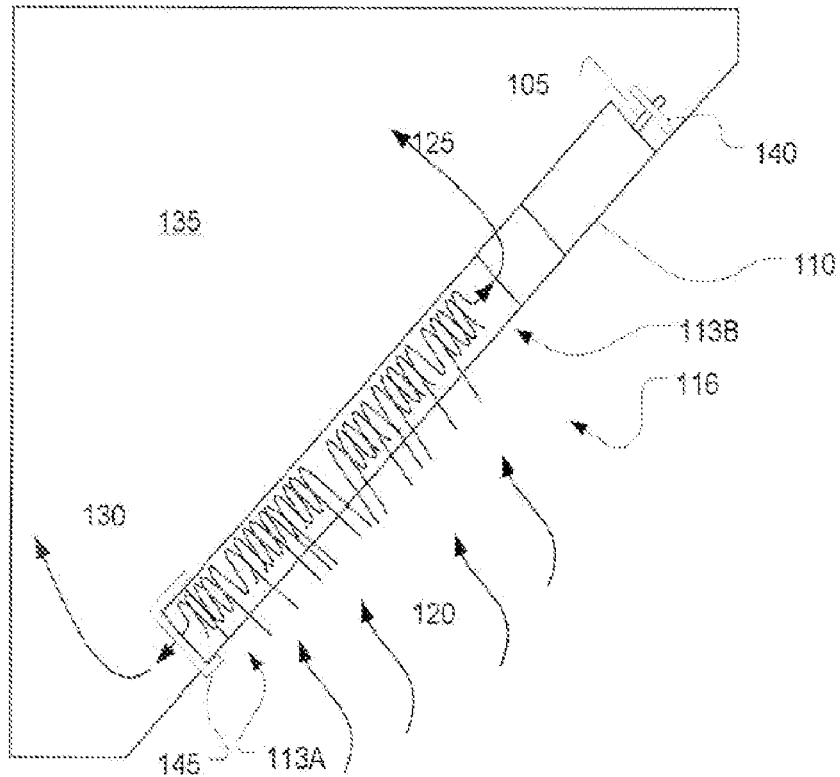
FIG. 1E is a side view of a grease extraction filter frame embodiment which can be incorporated into a standard hood extraction filter opening.

FIG. 1E is a side, section, view of a filter frame embodiment such as may be used in the embodiment described with reference to FIG. 1D. In the embodiment of FIG. 1E, the path of exhaust fumes from an area below and/or within a protected canopy are indicated at 120. Air 120 enters a single filter chamber and moves in a centrifugal or helical motion toward the top and bottom outlets of the filter. Air exits from the bottom and top, 113A and 113B, of the filter as indicated by flows 125 and 130 and into an exhaust plenum 135 and is finally drawn out and disposed of.

Figure 1F:
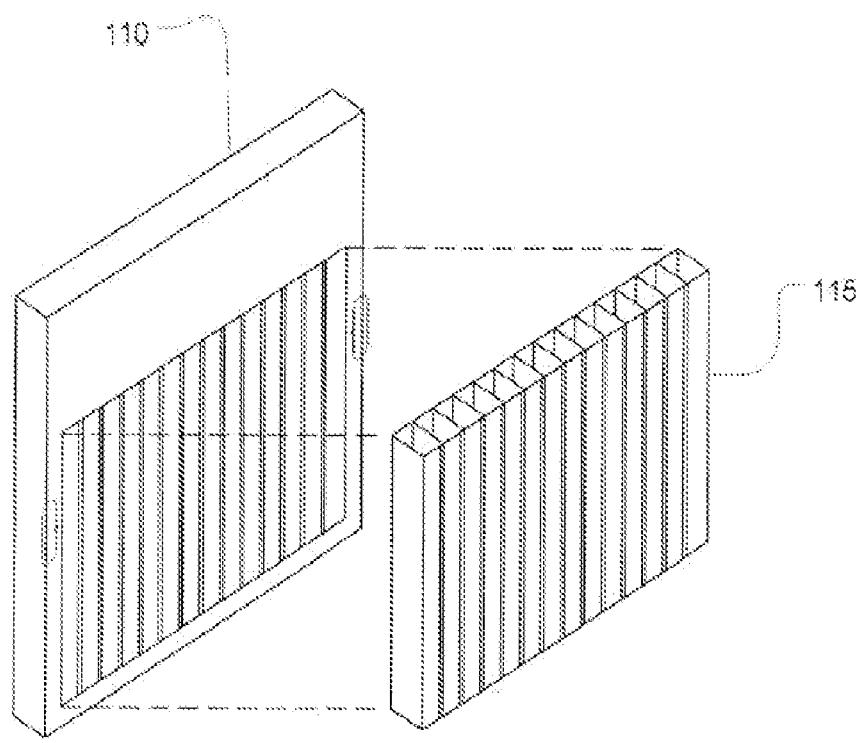
FIG. 1F is an isometric view of a alternate grease extraction filter frame embodiment which can be incorporated to fit into a standard hood extraction filter opening.
Figure 1G:
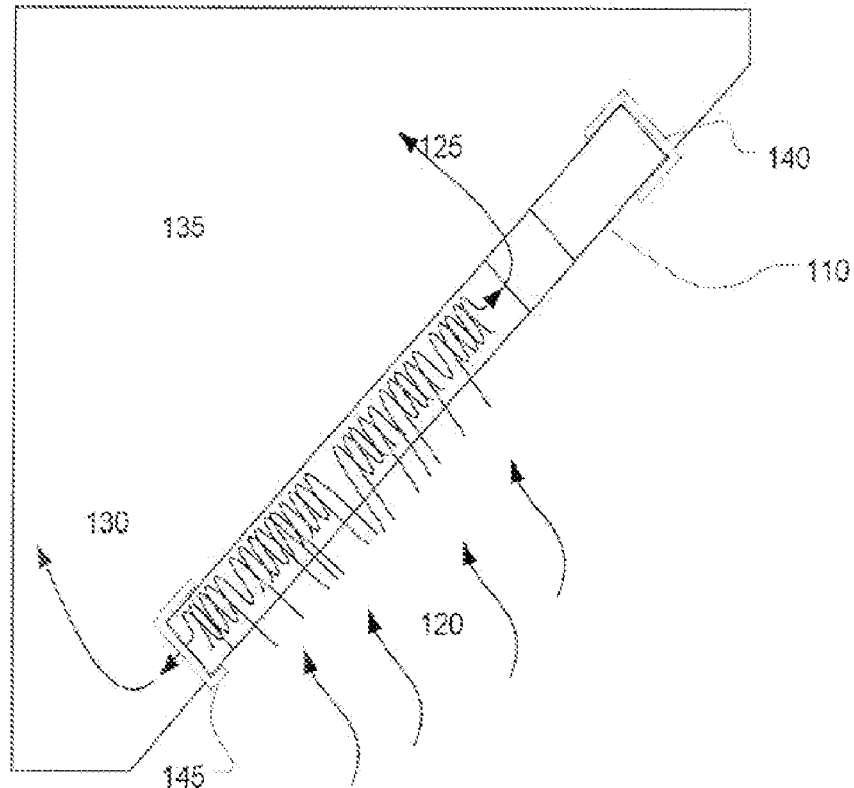
FIG. 1G is a side view of an alternate grease extraction filter frame embodiment which can be incorporated into a standard hood extraction filter opening.

FIGS. 1F and 1G show an embodiment of a retrofit grease extraction filter 115 in which the filter housing is supported as in the embodiment of FIGS. 1A to 1C rather than using pins 105. Otherwise it is substantially the same as the previous embodiment.

Figure 2A:
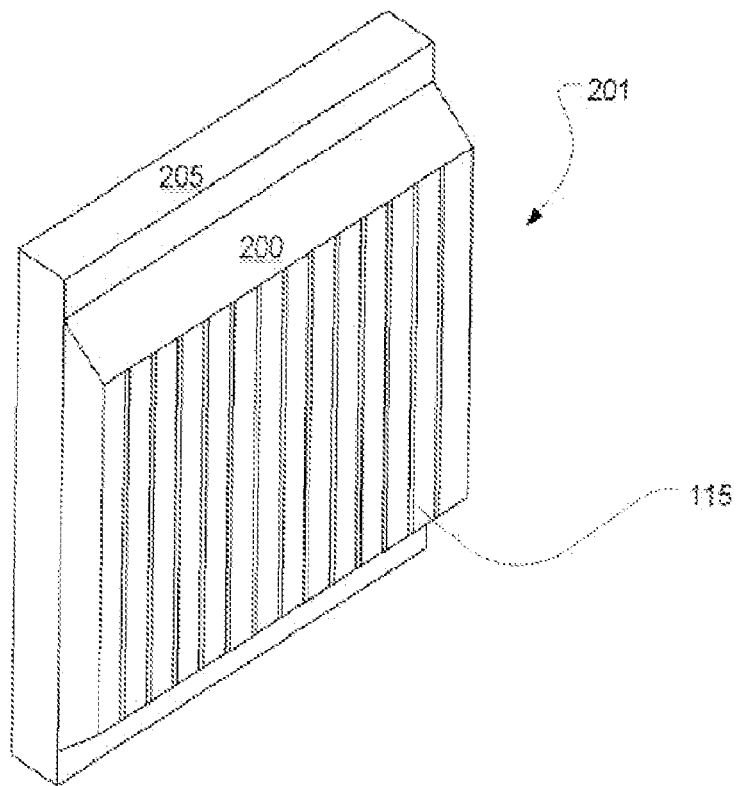
FIG. 2A is an isometric view of an embodiment where the extraction filter is installed behind the filter frame.
Figure 2B:
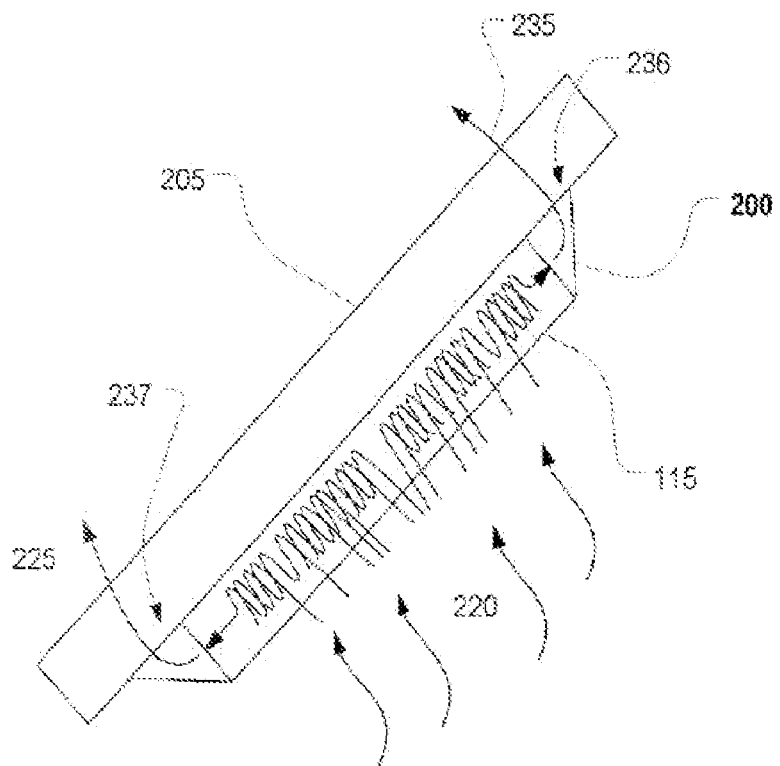

FIGS. 2A and 2B show a different embodiment of a filter cartridge 201 with a grease extraction filter portion 115 similar to that of the previous embodiments is housed inside an offset plenum frame 200 which is attached to a frame 205 configured to fit any of the previously-discussed filter attachments of the hood.

As shown in FIG. 2B, the airflow path through this frame embodiment, the effluent from the cooking process 220 enters the filter and spins in a centrifugal fashion toward the bottom 225 and top 235 of the filter. The airflow at the bottom 225 and top 235 are redirected through openings 236 and 237 as illustrated by the offset plenum frame 200.

In an alternative embodiment, the filter frame 205 may provide a second stage of grease filtration such as a mesh depth-loading type of media to improve the overall grease removal efficiency of the filtering system.

Figure 3A:
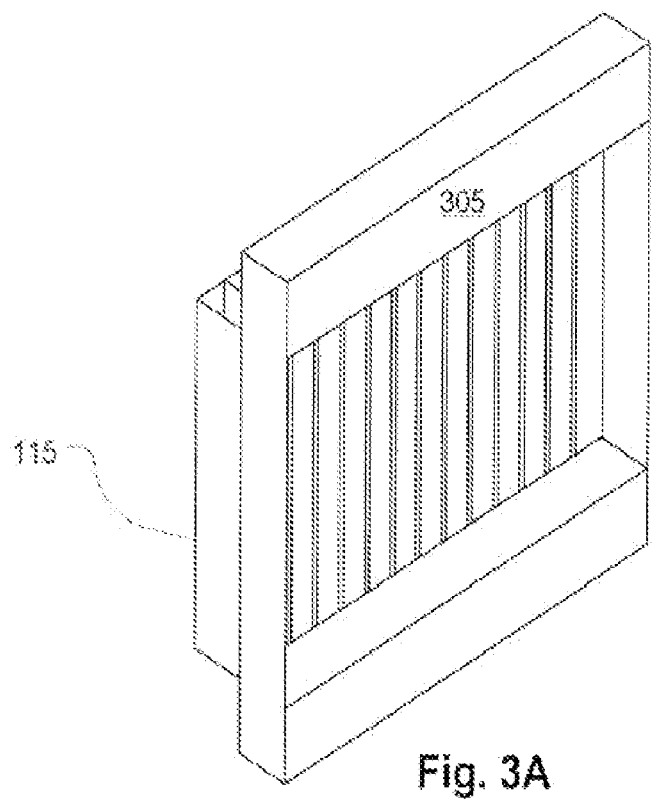
FIG. 3A is an isometric view of an embodiment where the extraction filter is installed behind the filter frame.
Figure 3B:
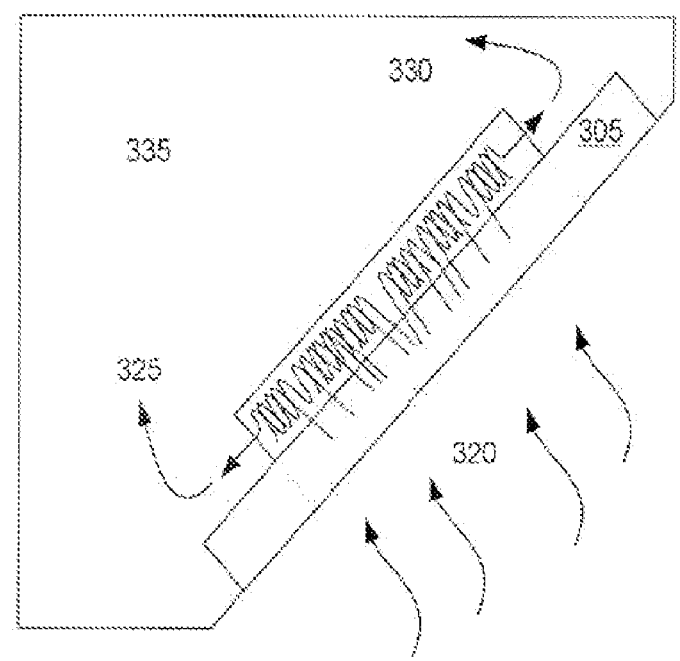
FIG. 3B is a side view of the embodiment with the extraction filter behind the filter frame.

FIG. 3A is an isometric view of an embodiment of a grease extraction filter 115 which is recessed behind a filter frame 305. FIG. 3B shows a side view of this embodiment where the effluent from the cooking process 320 goes into the grease extraction filter frame 305 and then enters the cyclonic filter 115. The exhaust air exists the grease extraction filter via the airflow out of the bottom of the filter 325 and out of the top of the filter 330 into the exhaust plenum 335 of the hood. One advantage to this embodiment is that there is less restriction on the air leaving the bottom 325 and top of the grease extraction filter 330 than if the grease extraction filter 115 were installed as shown in FIG. 1D or FIG. 2A. One benefit of having less restriction to the airflow is that the pressure drop through the grease extraction filter will be lower for a given airflow resulting in less energy required to operate the exhaust fan of the hood system.

Figure 4A:
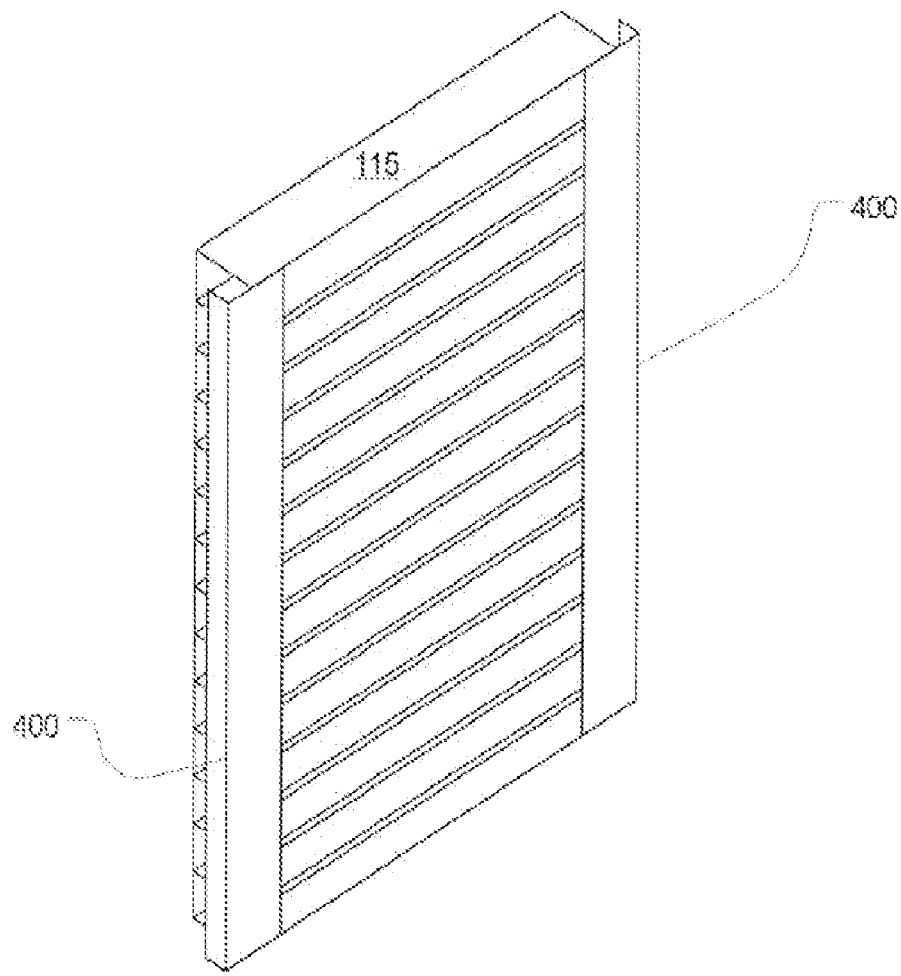
FIG. 4A is an isometric view of an embodiment of an extraction filter which is rotated 90 degrees so that the chambers run horizontally.

FIG. 4A is an isometric view of an embodiment of a cyclonic filter which is rotated 90 degrees so that the chambers run horizontally.

Figure 4B:
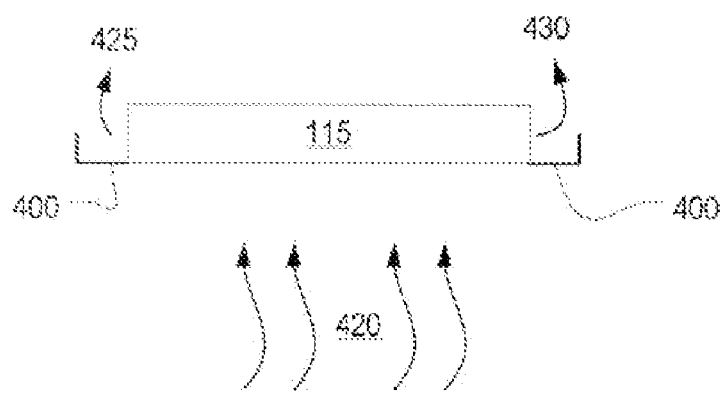
FIG. 4B is a top of an embodiment where the extraction filter is rotated 90 degrees so the chambers are horizontal in orientation.

FIG. 4B is a top view of an embodiment where the grease extraction filter 115 is rotated 90 degrees so that the chambers are horizontal in orientation. With this embodiment flanges 400 are utilized to provide a gap between the grease extraction filter and the hood so that there is little or no interference in airflow. In this embodiment, the cooking effluent 420 enters the grease extraction filter and exits the left of the grease extraction filter via air path 425 or the right side of the grease extraction filter via air path 430.

Figure 5A:
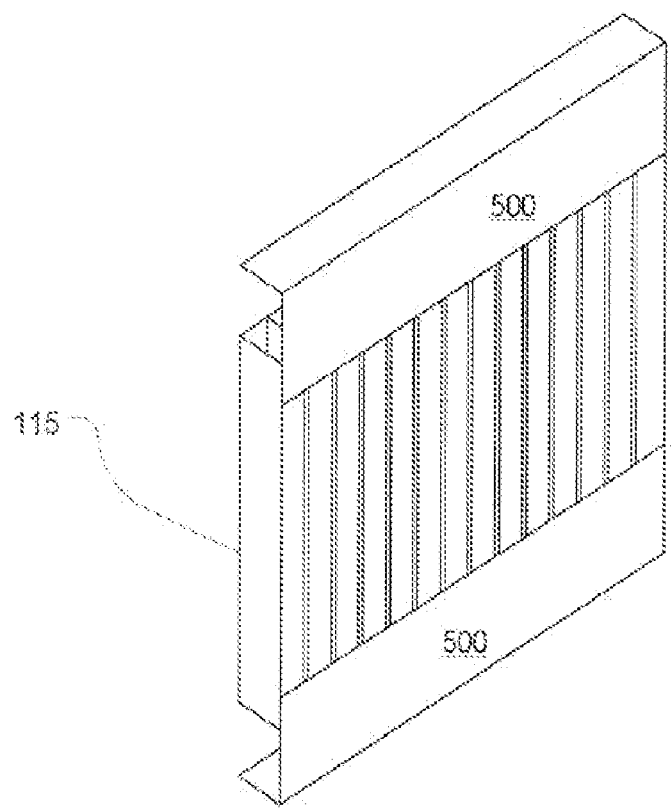
FIG. 5A is an isometric view of an embodiment of a grease extraction filter which has flanges on the top and bottom of the filter to hold it in place.

FIG. 5A is an embodiment of a grease extraction filter 115 which has flanges 500 on the top and bottom ends of the filter 115 allowing the filter 115 to be inserted into an existing exhaust hood with minimal or no interference to airflow.

Figure 5B:
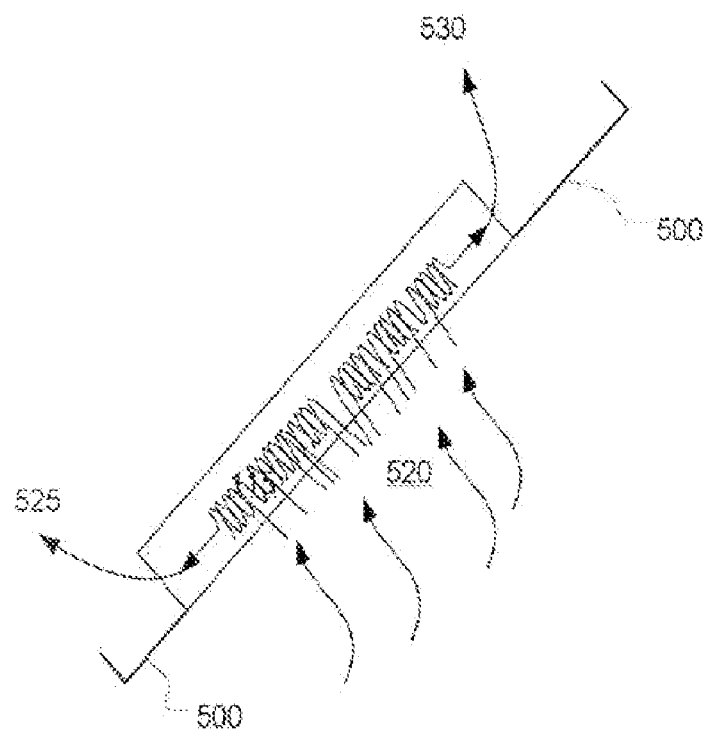
FIG. 5B is a side view of an embodiment of a grease extraction filter with flanges to hold the filter in place.

FIG. 5B shows the effluents from cooking 520 entering the grease extraction filter 115 and exiting out of either the bottom of the filter via air path 525 or the top of the filter following air path 530. The filter 115 is held in place in the exhaust hood by flanges 500 attached to the top and bottom of the grease extraction filter 115.

Figure 6A:
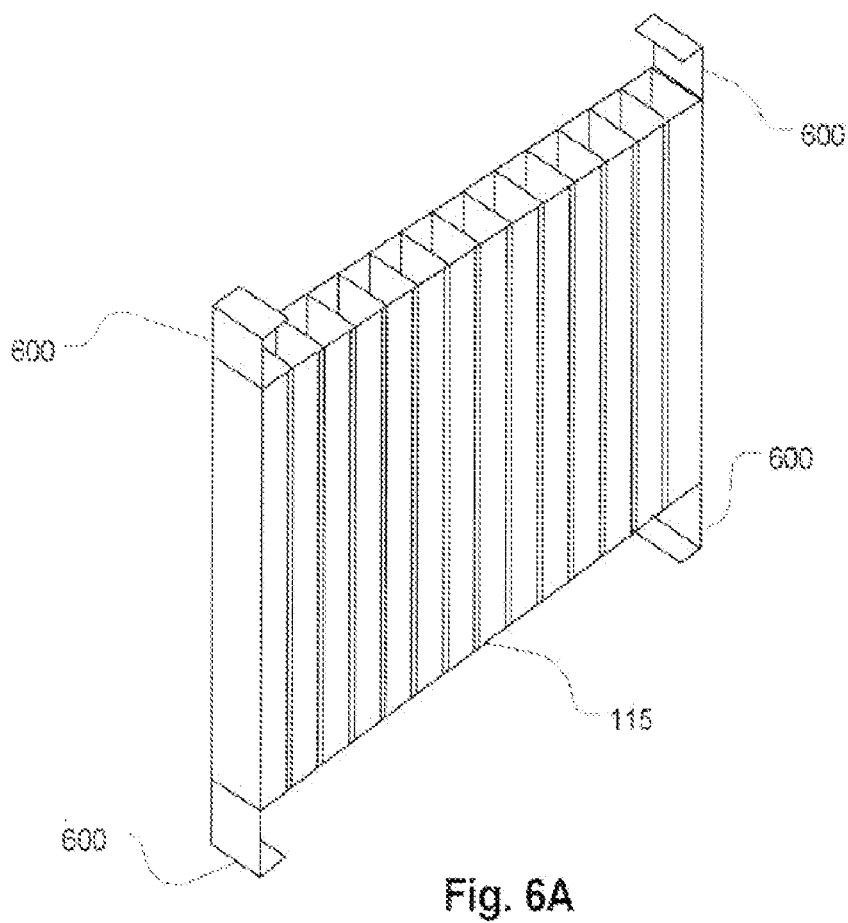
FIG. 6A is an isometric view of an embodiment of a grease extraction filter which has flanges on the right and left sides of the filter to hold it in place in an exhaust hood.

FIG. 6A is an isometric view of an embodiment of a grease extraction filter 115 which has flanges 600 attached to the right and left of the filter 115 to hold the filter in the exhaust hood. Two advantages of this embodiment over that shown in FIG. 4A and FIG. 5A are that it uses less raw material to manufacture the flanges 600 which cause it to be lighter in weight and less of the filter 115 outlets are blocked by the flanges 600 which will reduce filter pressure drop thereby increasing energy efficiency.

Figure 6B:
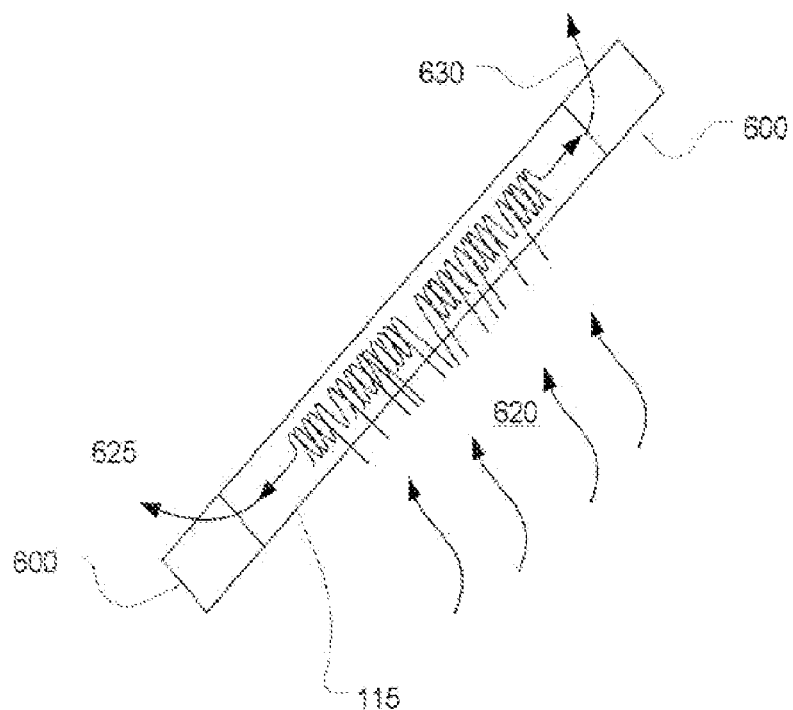
FIG. 6B is a side view of an embodiment of a grease extraction filter which has flanges on the right and left side of the filter.

FIG. 6B is a side view of an embodiment of a grease extraction filter 115. The effluent 620 from the cooking process enters the grease extraction filter and exits the filter 115 following the airflow out of the bottom of the filter 625 or out of the top of the filter 630.

Figure 7A:
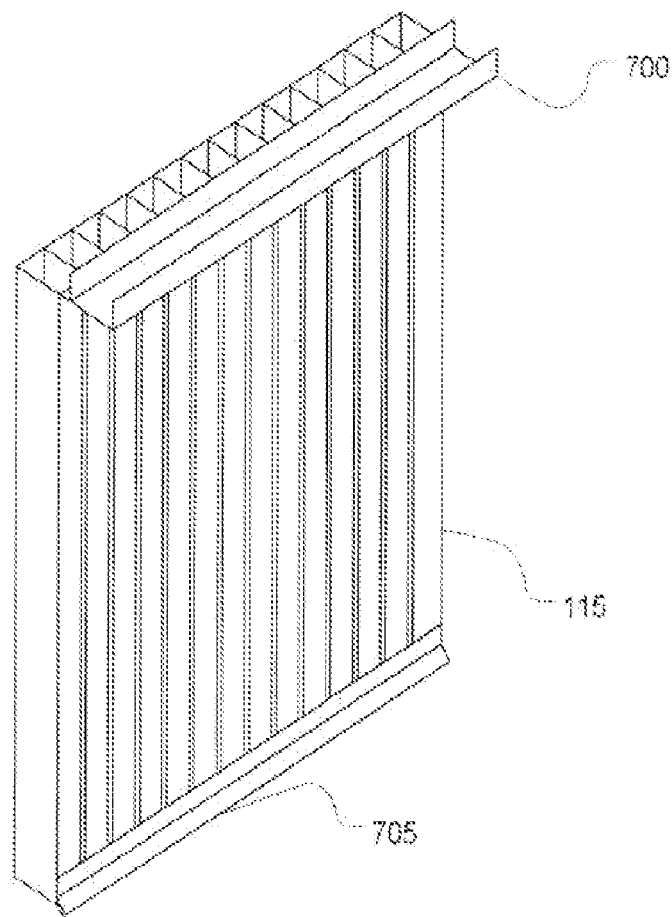
FIG. 7A is an isometric view of a grease extraction filter embodiment where the filter is held in place with a spring metal bracket.

FIG. 7A is an isometric view of an embodiment of a grease extraction filter 115 whereby the filter is held in place to the existing hood through the use of a bracket 700 manufactured out of a spring metal material and a hook 705 on the bottom edge of the filter. One advantage of this embodiment over that described in FIG. 6A is that no portion of the filter bracket 700 or hook 705 blocks the outlets of the grease extraction filter 115.

Figure 7B:
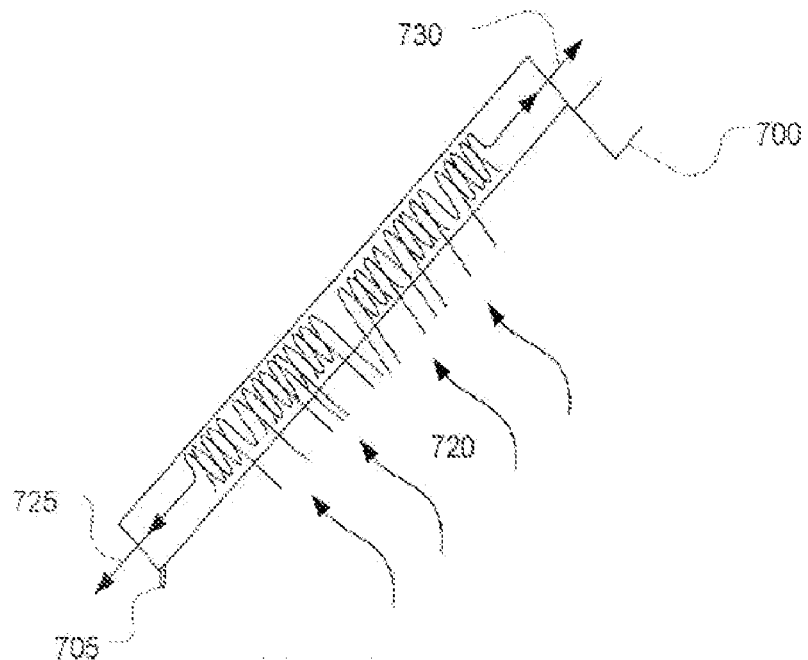
FIG. 7B is a side view of a grease extraction filter embodiment where the filter is held in place with a spring metal bracket.

FIG. 7B is a side view of a grease extraction filter embodiment utilizing a spring metal filter bracket 700 to hold the filter in place in an exhaust hood. The filter bracket 700 fits into a standard filter opening. A hook 705 at the bottom of the filter also helps to hold the grease extraction filter 115 in place. The cooking effluent 720 enter the filter and can exit by following the airflow out of the bottom of the filter 725 or out of the top of the filter 730. The top and bottom of the filters are not blocked any components of grease extraction filter 115 assembly.

Figure 8A:
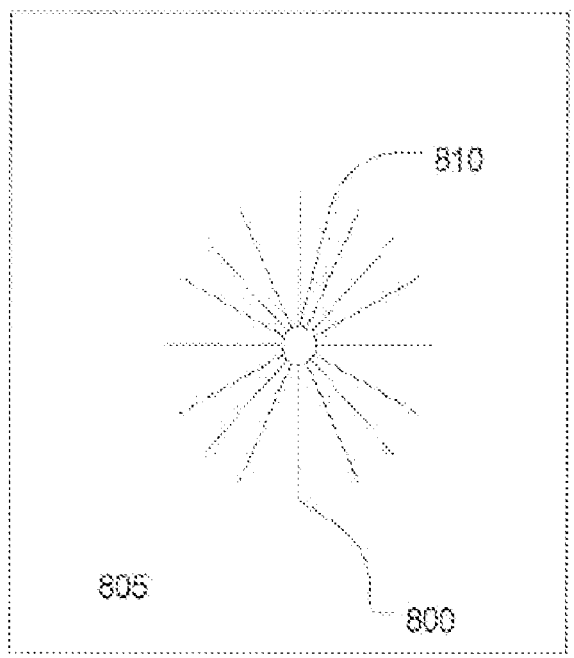
FIG. 8A is a top view of an embodiment of a grease extraction filter utilizing a brush assembly to enhance grease removal efficiency.

FIG. 8A is a top view of an embodiment of a single chamber 805 of a grease extraction filter which has brush bristles 800 inside the chamber 805. The brush bristles are shown attached to a spindle 810.

Figure 8B:
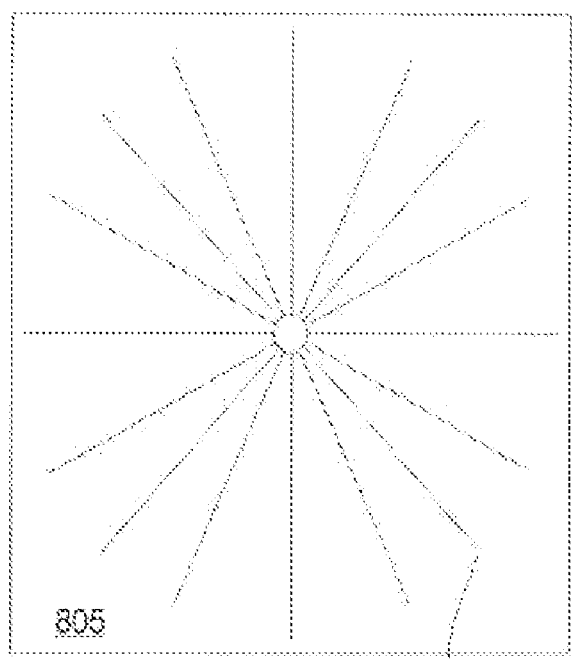
FIG. 8B is a top view of another embodiment of a grease extraction filter which utilizes a brush with longer bristles to further improve the grease removal efficiency.

FIG. 8B is a top view of an embodiment of a single chamber 805 of a grease extraction filter where the brush bristles 800 have been lengthened over what is described in FIG. 8A. The advantage of the longer bristles 800 are that this grease extraction filter embodiment will exhibit a higher grease extraction removal efficiency than the embodiment shown in FIG. 8A but this filter embodiment will also have a higher pressure drop than the embodiment shown in FIG. 8A.

Figure 9A:
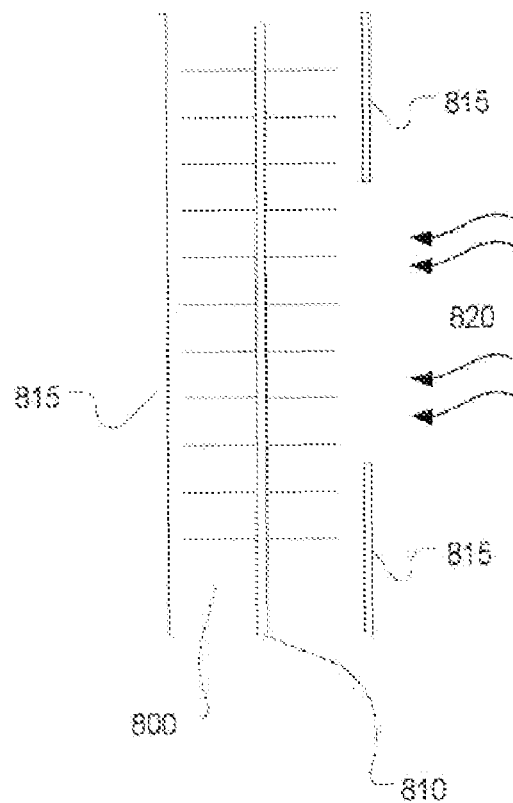
FIG. 9A is a side view of a brush bristle embodiment for grease extraction.

FIG. 9A is an embodiment of a bristle arrangement in which the bristles 800 are connected to a center spindle rod 810. The cooking effluent 820 enters the filter 815, passes through the brush bristles 800 and exits the top and bottom of the filter 815.

Figure 9B:
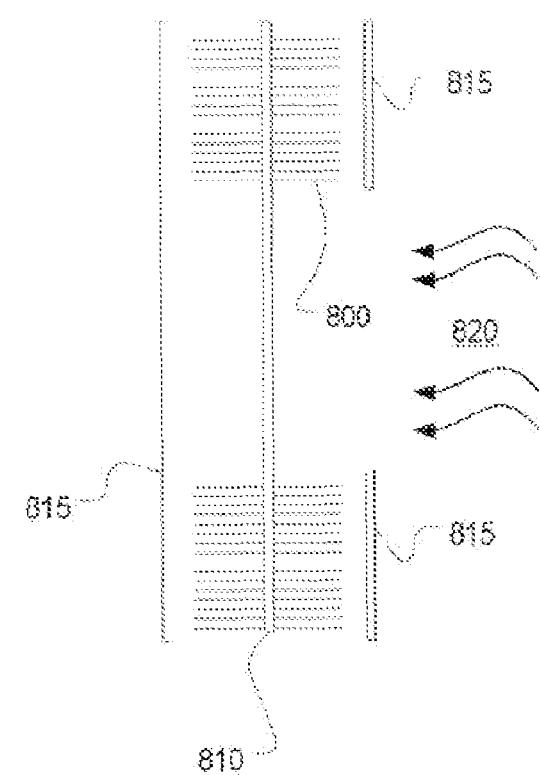
FIG. 9B is a side view of a densely packed brush bristle embodiment for grease extraction.

FIG. 9B is an embodiment of a bristle arrangement 800 where the bristles have all been moved to one end of the spindle rod 810. In this embodiment, the bristles 800 are enclosed by the filter 815. One advantage of this embodiment is that the bristles 800 are protected from direct flame impaction in the cooking effluent air stream 820 in case of a flare-up during the cooking process. Additionally this embodiment shows the bristles 800 located at the top and bottom of the filter 815. Alternatively, the bristles 800 may be located at only end of the filter 815.

Figure 9C:
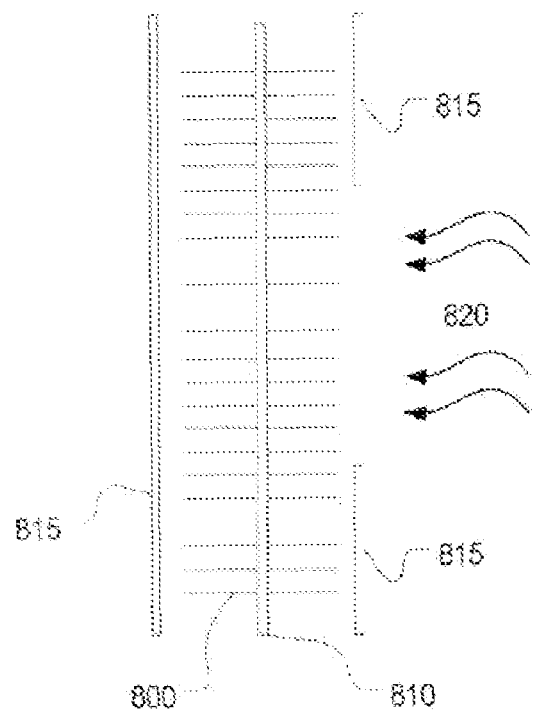
FIG. 9C is a side view of an embodiment showing a higher bristle density for grease extraction efficiency.

FIG. 9C is a embodiment of a bristle arrangement 800 where the bristles 800 are more closely packed than the embodiment shown in FIG. 9A. The grease extraction efficiency of the filter 815 may be modified by altering the brush 800 densities as shown in FIGS. 9A and 9C. Alternatively, the bristle 800 density could be modified to achieve a desired pressure drop across the filter 815 to optimize the energy performance of the kitchen exhaust hood.

Figure 10A:
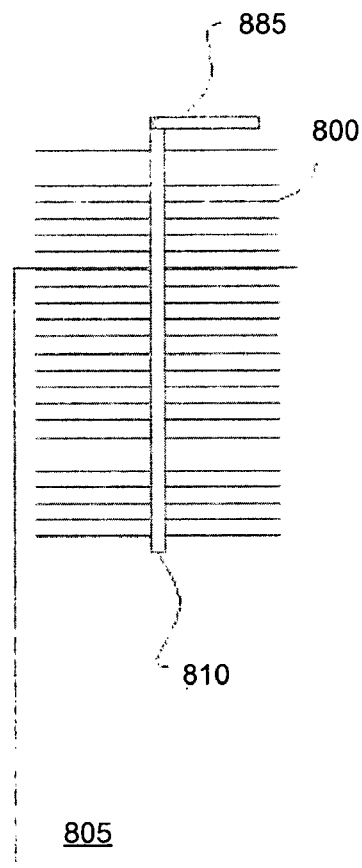
FIG. 10A is a side view of an embodiment of a brush bristle arrangement which has an actuating lever to move the brush assembly.
Figure 10B:
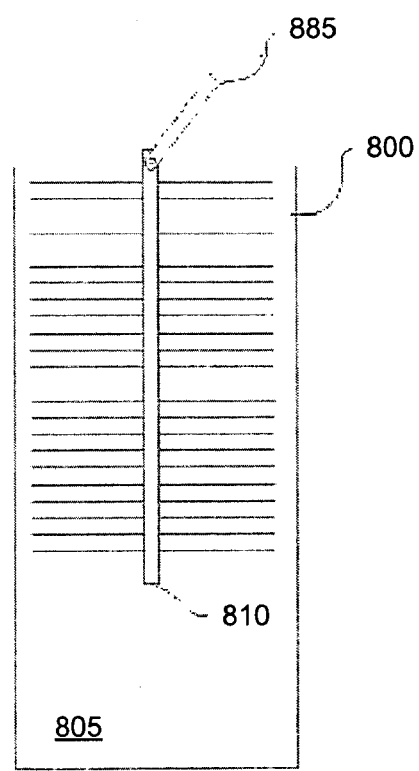
FIG. 10B is a side view of an embodiment of a brush arrangement where the actuating lever has been moved to a different position.

FIG. 10A is a side view of a brush bristle 800 arrangement where the bristles are attached to a spindle 810 and the spindle can be raised and lowered inside a filter chamber 805 through means of an actuating lever 885. FIG. 10B shows the system with the bristles 800 recessed further into the filter chamber 805. This embodiment could be utilized to modify the filter pressure drop and grease extraction efficiency of the filter system in the field. Additionally, this embodiment could also be utilized as a hood balancing feature to adjust the exhaust airflow in the field. The actuating lever 885 (e.g., linkage) could be connected to an actuator to provide real-time adjustment of the filter position.

Figure 11A:
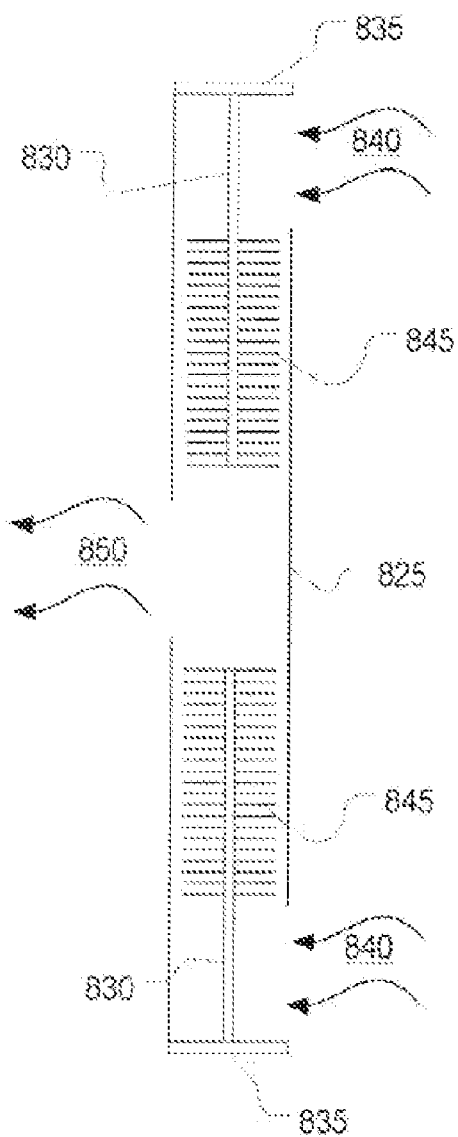
FIG. 11A is a side view of a grease extraction filter where air enters the filter through the top and bottom of the front of the filter, passes through brushes and exits out of the back middle of the filter.

FIG. 11A is a side view of an embodiment of a grease extraction filter 825 where the cooking effluent 840 enters the top and bottom of the front of the grease extraction filter 825, flows through a series of brush bristles 845, and exits out of the rear of the filter following the airflow 850. In this embodiment the brush bristles 845 are connected to a spindle 830 which is in turn connected to end caps 835 on the top and bottom of the filter assembly. The end caps 835 are removable so that the spindle 830 and bristles 845 may be removed for cleaning. This embodiment builds on that described in U.S. Pat. No. 6,251,153 which describes a centrifugal filter configuration without any filter media inside the filter.

Figure 11B:
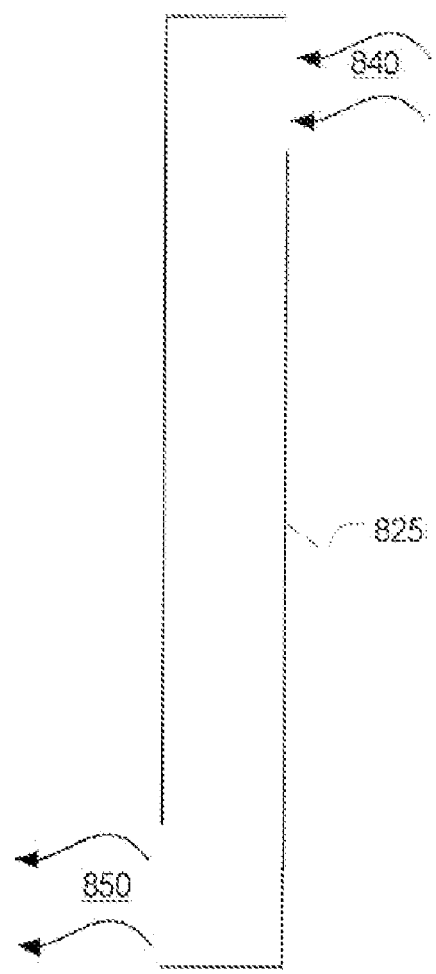
FIG. 11B is a side view of a grease extraction filter where the air is drawn into the top of a filter and exits out the bottom of the back side.

FIG. 11B is a side view of an embodiment of a grease extraction filter 825 where the cooking effluent 840 enters the top of the grease extraction filter 825, spins centrifugally through the filter, and exists out of the bottom of the filter following air path 850. One advantage of this embodiment is that it will have a high grease extraction efficiency since the airflow must travel the entire length of the filter chamber. This filter may also be equipped with the end caps 835, spindle 830, and brush bristles 845 described in FIG. 11A to further enhance the grease extraction efficiency of the filter.

Figure 11C:
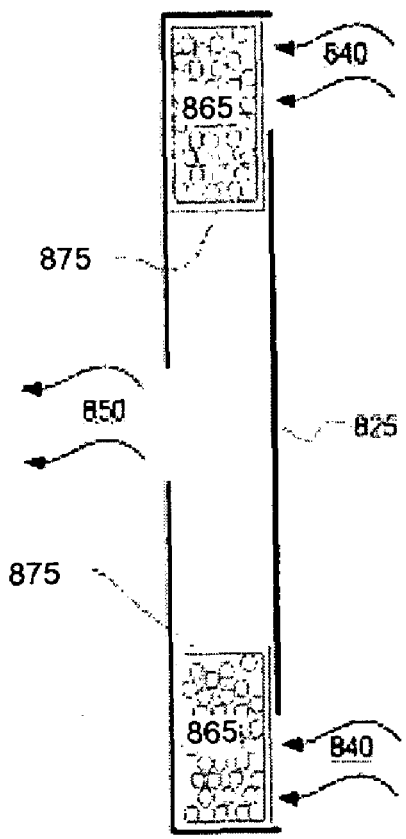
FIG. 11C is a side view of a grease extraction filter where the air is drawn into the top and bottom of a front side of the filter, flows through packed filter media, and exits out of a back side of the filter.

FIG. 11C is a side view of an embodiment of a grease extraction filter 825 where the cooking effluent 840 enters the top and bottom of the front of the grease extraction filter 825, flows through a packed filter media 865, and exits out of the rear of the filter following the airflow 850. In this embodiment the packed filter media 865 are held in place inside a cage 875 so that the media does not get carried away by the airflow moving through the cage 875. The end caps 835 are removable so that the cage 875 and packed filter media 865 may be removed for cleaning.

Figure 12A:
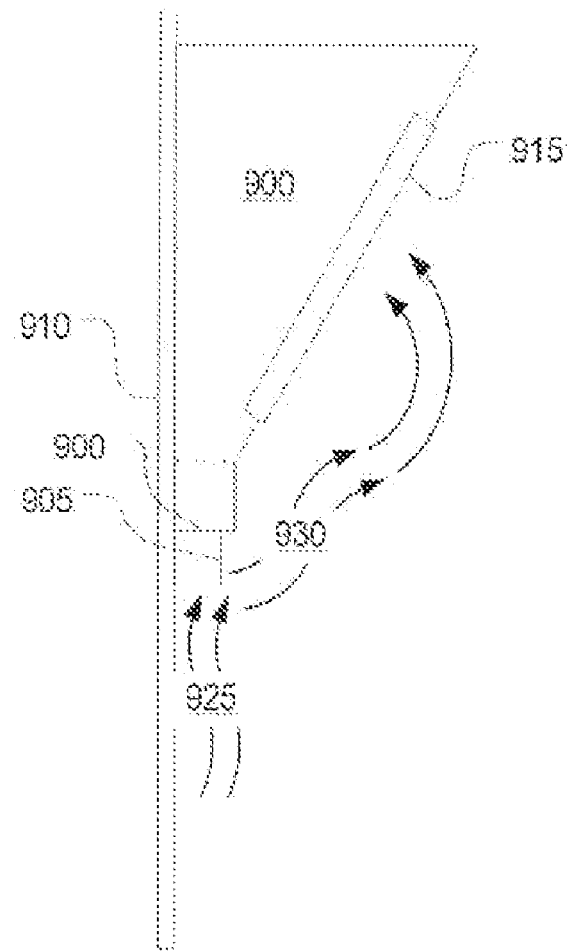
FIG. 12A is a side view of an exhaust hood which as a flat standoff and grease cup underneath the standoff.

FIG. 12A is a side view of a typical embodiment of an exhaust hood 900 which has a flat standoff 902 on the bottom of the hood and a grease cup 905 suspended from the standoff 902. In this embodiment cooking effluent 925 is entrained along a wall 910. When the cooking effluent 925 reaches the grease cup 905 and/or the standoff 902, it is diverted away from the grease extraction filters 915 following an air path 930. One negative aspect of this embodiment is that a higher exhaust airflow will be required to sufficiently capture the cooking effluent 930.

Figure 12B:
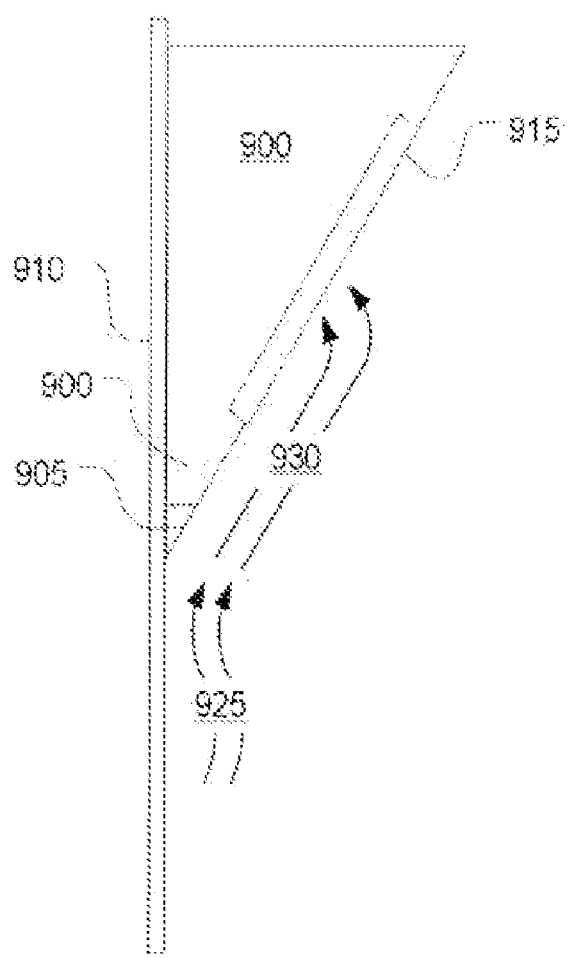
FIG. 12B is a side view of an exhaust hood which has an inclined standoff and an integrated grease cup to improve hood performance.

FIG. 12B is a side view of an exhaust hood 900 embodiment where the standoff 904 has been inclined to match the angle of the grease extraction filter 915 and the grease cup 905 has been integrated into the standoff 904. In this embodiment cooking effluent 925 is entrained along a wall 910 following air path 925. In this embodiment the cooking effluent 925 is not obstructed and can easily follow the airflow path 930 into the grease extraction filters 915. One advantage to this embodiment is that the hood can sufficiently capture the cooking effluent at a lower exhaust airflow leading to energy savings and improved hood performance.

In any of the above embodiments with long slot-type inlets, the bristle density of the brushes may be graded such that near the ends of the inlet slots, the density is higher and toward the middle of the inlet slots it is lower. In this way, fumes entering the inlet slot near the ends of the flow channels will pass through the higher density bristles at least.

What is claimed is:

1. A grease extraction filter assembly, comprising:
   a filter portion having parallel flow channels, each flow channel having an inlet portion and an outlet portion;
   each flow channel having at least one end and a spoked structure with a longitudinal support extending substantially along a flow path between respective inlet and outlet portions, the longitudinal support having bristles extending in a radial pattern therefrom;
   the spoked structure being inserted in the each flow channel and removable therefrom at the each flow channel at least one end.

2. An assembly as in claim 1, wherein the spoked structures are connected to a common support located outside the filter portion to allow removal of the spoked structures from multiple flow channels at once.

3. An assembly as in claim 1, wherein the radial pattern is a 360 degree pattern.

4. An assembly as in claim 1, wherein the spoked structures are supported by the respective bristles.

5. An assembly as in claim 1, wherein the inlet portions of the flow channels include inlets forming slots parallel to the longitudinal supports.

6. An assembly as in claim 5, wherein the outlet portions of the flow channels include flow exits at ends of the flow channels.

7. An assembly as in claim 5, wherein the inlets provide for flow into the flow channels in a direction perpendicular to the longitudinal supports.

8. An assembly as in claim 7, wherein the longitudinal supports are parallel to longitudinal axes of the flow channels.

9. An assembly as in claim 1, wherein the flow channels are rectangular ducts with slot-shaped inlets along a face of each duct and flow exits at their ends.

10. An assembly as in claim 9, wherein the spoked structures are connected to a common support located outside the filter portion to allow removal of the spoked structures from multiple flow channels at once.

11. An assembly as in claim 9, wherein the radial pattern is a 360 degree pattern.

12. An assembly as in claim 9, wherein the spoked structures are supported by the respective bristles.

13. An assembly as in claim 9, wherein the inlets provide for flow into the flow channels in a direction perpendicular to the longitudinal supports.

14. An assembly as in claim 13, wherein the longitudinal supports are parallel to the longitudinal axes of the flow channels.

15. An assembly as in claim 1, wherein each support has bristles extending in a radial pattern along a substantial portion of the support's length along the respective flow path.

16. An assembly as in claim 1, wherein each support additionally extends along the respective inlet portion, the support's length along the respective inlet portion being substantially bristle-free.

17. An assembly as in claim 1, wherein each support additionally extends along the respective outlet portion, the support's length along the respective outlet portion being substantially bristle-free.

18. An assembly as in claim 1, further comprising an actuating lever connected to each spoked structure and configured to displace each spoked structure parallel to a longitudinal axis of the respective flow channel.

19. A grease extraction filter assembly, comprising:
a filter portion having parallel flow channels, each flow channel having an outlet portion, the flow channels being adjacent to form a common inlet face and having inlets through the common inlet face;
each flow channel having at least one end and a spoked structure with a longitudinal support extending substantially along a flow path between the respective inlet and outlet portion, the support having bristles extending in a radial pattern therefrom.

20. An assembly as in claim 19, wherein the outlets portions include outlets on a side of the channels opposite the inlets, the inlets and outlets being displaced in an axial direction relative to each other.

21. An assembly as in claim 19, wherein the inlets are located at one end of the common inlet face.

22. An assembly as in claim 21, wherein the outlet portions include outlets on a side of the channels opposite the inlets, the outlets being displaced in an axial direction relative to the inlets.

23. A grease extraction filter assembly, comprising:
a filter cartridge having at least two parallel flow channels, each flow channel having an inlet, an outlet, and a longitudinal axis, all the inlets facing a common side of the filter cartridge;
each of the flow channels having a removable brush element having radial bristles surrounding a longitudinal support, the longitudinal support being aligned with said longitudinal axis and extending substantially along a flow path between the respective inlet and outlet.

24. An assembly as in claim 23, wherein the cartridge is a generally planar module having an approximately square aspect ratio.

25. An assembly as in claim 24, wherein the inlets face a major plane of the module.

* * * * *

UNITED STATES PATENT AND TRADEMARK OFFICE
CERTIFICATE OF CORRECTION

PATENT NO.        : 7,588,617 B2                                               Page 1 of 1
APPLICATION NO.   : 11/495744
DATED             : September 15, 2009
INVENTOR(S)       : Kyllönen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 289 days.

Signed and Sealed this

Fourteenth Day of December, 2010

David J. Kappos
*Director of the United States Patent and Trademark Office*